United States Patent [19]

Letsche

[11] 4,303,967
[45] Dec. 1, 1981

[54] WELDING LIGHT

[75] Inventor: David M. Letsche, Rte. 3, Box 362, Proctorville, Ohio 45669

[73] Assignee: David M. Letsche, Proctorville, Ohio

[21] Appl. No.: 131,947

[22] Filed: Mar. 21, 1980

[51] Int. Cl.³ .......................... F21V 33/00; B23K 9/28
[52] U.S. Cl. .................... 362/119; 219/138; 362/120; 362/192; 362/222; 362/223; 362/226; 362/253; 362/255; 362/263; 362/265; 362/267; 362/275; 362/311; 362/363; 362/368; 362/370; 362/375; 362/376; 362/421
[58] Field of Search .............. 362/158, 222, 223, 226, 362/253, 255, 263, 264, 265, 267, 269, 275, 311, 363, 368, 370, 375, 376, 377, 421, 119, 120, 192; 219/138, 147

[56] References Cited

U.S. PATENT DOCUMENTS

| | | | |
|---|---|---|---|
| 2,029,487 | 2/1936 | Kleine | 362/119 |
| 2,046,999 | 7/1936 | Bredtschneider | 219/138 |
| 2,196,171 | 4/1940 | Arnesen | 362/119 |
| 2,228,680 | 1/1941 | Tornblom | 362/376 |
| 2,334,579 | 11/1943 | Powell | 362/211 |
| 2,588,288 | 3/1952 | Pohanka | 362/119 |
| 2,715,675 | 8/1955 | Macksoud | 362/265 |
| 2,747,077 | 5/1956 | Salm | 219/138 |
| 2,776,364 | 1/1957 | Daniels | 362/265 |
| 2,777,942 | 1/1957 | Lester | 362/267 |
| 2,854,564 | 9/1958 | Cohen et al. | 362/119 |
| 2,957,072 | 10/1960 | Rigel | 362/255 |
| 3,023,306 | 2/1962 | Kester | 362/119 |
| 3,059,231 | 10/1962 | Arneberg et al. | 362/376 |
| 3,227,866 | 1/1966 | Peters et al. | 219/138 |
| 3,229,083 | 1/1966 | George, Jr. | 362/311 |
| 3,444,364 | 5/1969 | Taylor et al. | 362/226 |
| 3,883,731 | 5/1975 | Morton et al. | 362/263 |
| 3,916,145 | 10/1975 | Grubbs et al. | 219/147 |
| 4,069,415 | 1/1978 | Dacal | 362/263 |
| 4,201,005 | 5/1980 | Hunt | 362/267 |
| 4,225,771 | 9/1980 | Justice et al. | 219/147 |

FOREIGN PATENT DOCUMENTS 54-121583 9/1979 Japan ............................ 362/267

Primary Examiner—Teddy S. Gron

[57] ABSTRACT

This light is designed for use in the welding industry, for checking joint preparations, by lighting the area to be welded, lighting the area of a weld, so as to enable the user effectively to clean or chip slag from it, etc. It consists primarily of a sleeve, in which a high voltage bulb is received, that includes a resistor across the leads, and it is mounted to any electrode holder, by a ball and socket swivel, for changing the light angle.

2 Claims, 3 Drawing Figures

WELDING LIGHT

This invention relates to illuminating devices, and more particularly, to a welding light.

It is therefore the principal object of this invention to provide a welding light, which will be adaptable to all types of electrode holders, for lighting weld areas.

Another object of this invention is to provide a welding light, which will be powered by the welding machine current.

A further object of this invention is to provide a welding light, which will be mounted on an electrode holder, by ball and socket means, so as to easily change the direction of the light emitted therefrom.

A still further object of this invention is to provide a welding light, which will be particularly adaptable to "stick welding".

Other objects are to provide a welding light, which is simple in design, inexpensive to manufacture, rugged in construction, easy to use, and efficient in operation.

These, and other objects, will be readily evident, upon a study of the following specification, and the accompanying drawing, wherein.

Figure 1:
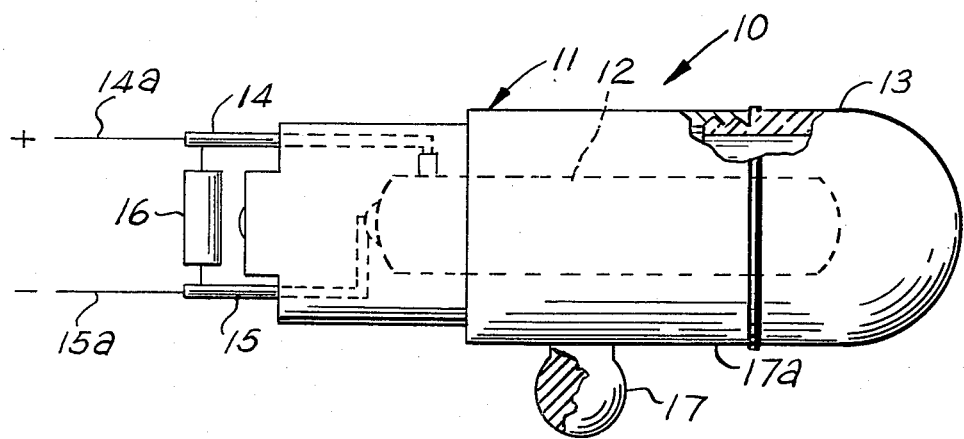
FIG. 1 is a side view of the present invention, shown in elevation and partly broken away.
Figure 2:
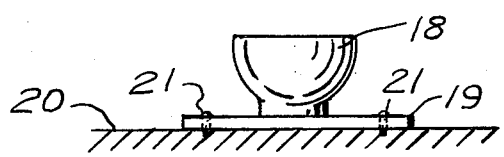
FIG. 2 is a side view of the socket member for receiving the ball portion of the sleeve of FIG. 1, and is shown mounted to an electrode holder, that is illustrated fragmentarily and in elevation.
Figure 3:
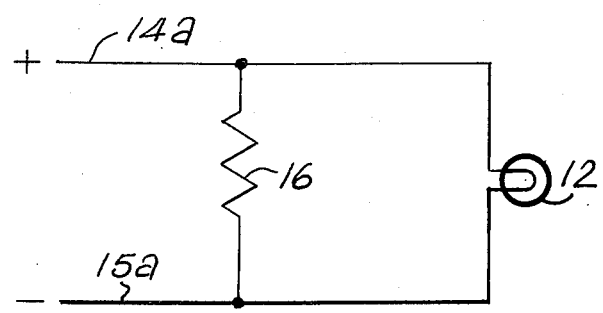
FIG. 3 is a schematic wiring diagram of the invention.

According to this invention, a welding light 10 is shown to include a hollow sleeve 11, in which is received a high voltage bulb 12. A protective translucent cover 13, is threadingly received in sleeve 11, and a positive prong 14 and negative prong 15 extend from the opposite end of sleeve 11. Prong 14 includes a positive lead 14a secured thereto, and prong 15 includes a negative lead 15a secured to it, for a purpose which hereinafter will be described.

A resistor 16 is wired across prongs 14 and 15 and a ball 17, common in the art, is fixedly secured to the outer periphery 17a of sleeve 12, so as to be received in a common socket member 18. Socket member 18 includes a flange 19, which is secured to electrode holder 20, by means of screw fasteners 21. The ball 17 and socket member 18 serve as swivel means, for directing light in any desired direction.

In use, the positive lead 14a is attached to any current passing portion of the electrode holder 20, and the negative lead 15a is attached by alligator clip means (not shown), to any part of the work piece, for the proper ground connection. When not in use, the negative lead 15a is folded up until needed.

It shall be recognized, that the voltage, current and resistance may vary, for different welding procedures.

While various changes may be made in the detail construction, it is understood that such changes will be within the spirit and scope of the present invention, as is defined by the appended claims.

What I now claim is:

1. A welding light assembly, comprising, in combination, a welding rod holder and welding light mounted thereupon, for illuminating an area of a weld at the front end of said holder, a high voltage bulb, a sleeve enclosing a larger rear portion of said bulb, while a smaller forward portion of said bulb protrudes outwardly into a translucent cover on said sleeve front end, a recess inside said cover receiving and enclosing a said bulb forward portion, a pair of rearwardly extending prongs from a rear of said sleeve electrically being connected to said bulb, a resistor connected between said prongs, a spherical ball fixedly secured to an outer side of said sleeve, a socket member in which said ball is swiveled, a flange included on said socket member, and holes through said flange receiving screw fasteners secured on said welding rod holder.

2. The combination as set forth in claim 1, wherein said prongs are electrically connected to a welding machine electric current.

* * * * *